United States Patent
Liang et al.

(10) Patent No.: US 8,581,568 B2
(45) Date of Patent: Nov. 12, 2013

(54) LOW POWER CONSUMPTION START-UP CIRCUIT WITH DYNAMIC SWITCHING

(75) Inventors: Enzhu Liang, Pacifica, CA (US); Jiang Chen, Cupertino, CA (US); Xuecheng Jin, Palo Alto, CA (US)

(73) Assignee: iWatt Inc., Campbell, CA (US)

( * ) Notice: Subject to any disclaimer, the term of this patent is extended or adjusted under 35 U.S.C. 154(b) by 449 days.

(21) Appl. No.: 12/907,777

(22) Filed: Oct. 19, 2010

(65) Prior Publication Data

US 2011/0096572 A1    Apr. 28, 2011

Related U.S. Application Data

(60) Provisional application No. 61/255,797, filed on Oct. 28, 2009.

(51) Int. Cl.
*G05F 3/16*    (2006.01)

(52) U.S. Cl.
USPC .......................................................... 323/313

(58) Field of Classification Search
USPC .................................................. 323/311–314
See application file for complete search history.

(56) References Cited

U.S. PATENT DOCUMENTS

| | | | | | |
|---|---|---|---|---|---|
| 5,440,254 | A | * | 8/1995 | Sundby | 327/79 |
| 5,886,657 | A | * | 3/1999 | Ahuja | 341/144 |
| 6,271,712 | B1 | * | 8/2001 | Ball | 327/531 |
| 7,826,190 | B2 | * | 11/2010 | Wu et al. | 361/91.1 |
| 2005/0136862 | A1 | * | 6/2005 | Schimper | 455/125 |
| 2007/0040657 | A1 | | 2/2007 | Fosler et al. | |
| 2007/0057716 | A1 | * | 3/2007 | Pan et al. | 327/539 |
| 2008/0106309 | A1 | * | 5/2008 | Abe | 327/143 |
| 2008/0143395 | A1 | * | 6/2008 | Frulio et al. | 327/143 |
| 2009/0039845 | A1 | | 2/2009 | Gerber et al. | |
| 2009/0219004 | A1 | | 9/2009 | Hirano | |
| 2011/0050203 | A1 | * | 3/2011 | Huang | 324/76.11 |

FOREIGN PATENT DOCUMENTS

| | | |
|---|---|---|
| KR | 10-0263924 B1 | 8/2000 |
| KR | 10-2002-0038760 A | 5/2002 |
| WO | WO 2009/039684 | 4/2004 |

OTHER PUBLICATIONS

PCT International Search Report and Written Opinion, PCT Application No. PCT/US2010/052509, Dec. 15, 2010, eight pages.
Korean Intellectual Property Office, Notice of Office Action, Korean Patent Application No. 10-2012-7013704, Aug. 26, 2013, twenty pages.

* cited by examiner

*Primary Examiner* — Adolf Berhane
*Assistant Examiner* — Jeffrey Gblende
(74) *Attorney, Agent, or Firm* — Fenwick & West LLP

(57) ABSTRACT

A start-up circuit in a switch-mode power converter that employs a Zener diode to provide a reference voltage to reduce the power consumption and the size of the start-up circuit. The start-up circuit also includes a coarse current source and a coarse reference voltage signal generator for producing current and reference voltage for initial startup operation of a bandgap circuit. The reference signal and current from coarse current source and the reference voltage signal generator are subject to large process, voltage and temperature (PVT) variations or susceptible to noise from the power supply, and hence, these signals are used temporarily during start-up and replaced with signals from higher performance components. After bandgap circuit becomes operational, the start-up receives voltage reference signal from the bandgap circuit to more accurately detect undervoltage lockout conditions.

13 Claims, 9 Drawing Sheets

LOW POWER CONSUMPTION START-UP CIRCUIT WITH DYNAMIC SWITCHING

CROSS-REFERENCE TO RELATED APPLICATION

This application claims priority under 35 U.S.C. §119(e) to co-pending U.S. Provisional Patent Application No. 61/255,797 entitled "Low Power Consumption Start-up Circuit with Dynamic Switching," filed on Oct. 28, 2009, the subject matter of which is incorporated by reference herein in its entirety.

BACKGROUND OF THE INVENTION

1. Field of the Invention

The present invention relates to a start-up circuit in a power converter to monitor line-in voltage to switch on or off the power converter.

2. Description of the Related Arts

A switching power converter generally includes a controller integrated chip (IC) that controls a switch for coupling or decoupling a load to or from a power source. Such controller IC includes, among other components, a start-up circuit. The start-up circuit monitors line-in voltage provided at the input of the power converter circuit and turns on components of the controller IC if the line-in voltage is higher than a start-up voltage. Conversely, if the line-in voltage drops below a threshold voltage (i.e., Undervoltage Lockout voltage or UVLO voltage), the start-up circuit shuts down the components of the controller IC. Even in no-load conditions, the start-up circuit remains operational and consumes power.

One of the major design criteria for the start-up circuit is low power consumption. As more energy efficient power converters become required, power consumption has become one of the major design criteria in designing power converters. Some AC-DC power converters, for example, are required to consume less than 30 mW under no-load conditions. In order to satisfy such strict requirement, the start-up circuit needs to consume as low power as possible. Another important design consideration for the start-up circuit is space occupied by the start-up circuit. To reduce the size of the controller IC and include more functionality in the power converters, the size of the start-up circuit also needs to be reduced.

FIG. 1 is a conventional start-up circuit 100 in a controller IC. Start-up circuit 100 generates an enable signal (EN) to operate components of a power converter, including main bandgap circuit 150. Supply voltage is provided across Vcc node and GND node connected to start-up circuit 100 and main bandgap circuit 150. Start-up circuit 100 of FIG. 1 includes a Low-Dropout (LDO) regulator 110, a bandgap block 114, a string of sensing resistors (R1 through R3), a multiplexer 118, a comparator 120, and a current generator 124. LDO 110 provides voltage signal $V_d$ to the bandgap block 114 via node N4 and to the comparator 120 via node N6. The bandgap block 114 is connected between node N4 and ground (GND) to generate reference voltage signal $V_{B1}$. Reference voltage signal $V_{B1}$ is fed to the inverted input of the comparator 120 via node N2 and to an input of LDO 130 in the main bandgap circuit 150.

Comparator 120 turns EN signal on or off based on reference voltage signal $V_{B1}$ from bandgap block 114. Specifically, the comparator 120 turns on EN signal when supply voltage Vcc to the start-up circuit 100 increases above a start-up voltage. Conversely, the comparator 120 turns off EN signal when supply voltage Vcc drops below a UVLO voltage.

Multiplexer 118 selectively connects the non-inverted input of the comparator 120 to node N3 or node N5 based on EN signal from the comparator 120. When EN signal is turned off, the multiplexer 118 connects node N5 to the non-inverted input of the comparator 120. Hence, the voltage across resistors R1 and R2 is received at the non-inverted input of the comparator 120. In contrast, if EN signal is turned on, multiplexer 118 connects node N3 to the non-inverted input of the comparator 120. In this way, the start-up voltage at which the comparator 120 turns on EN signal and the UVLO voltage at which the comparator 120 turns off EN signal can be set differently. Current generator 124 is turned on by EN signal to provide operating current to LDO 130 and bandgap block 134.

Main bandgap circuit 150 includes LDO 130 and bandgap block 134. LDO 130 receives voltage signal $V_{B1}$ from the bandgap block 114 and EN signal from comparator 120. Voltage signal $V_{B1}$ functions as a reference voltage signal for LDO 130. LDO 130 also receives current $I_L$ from the current generator 124. LDO 130 generates regulated voltage $V_{f2}$ that is fed to the input of bandgap block 134. Bandgap block 134 receives current $I_B$ and voltage $V_{f2}$, and generates reference voltage $V_{BG}$ that is more reliable and less susceptible to process, voltage and temperature (PVT) variations compared to voltage signal $V_{B1}$. The reference voltage $V_{BG}$ is used by various components of the controller IC as a reference voltage.

Startup-circuit 100 of FIG. 1, however, consumes a large amount of power (e.g., about 10 μA at start-up voltage of 10V) and takes up a large area within the controller IC partly due to the presence of LDO 110 and bandgap block 114.

SUMMARY OF THE INVENTION

Embodiments relate to a start-up circuit in a controller for a power converter that uses a Zener diode to provide a first reference voltage for determining whether supply voltage to an integrated circuit device is sufficiently high for operation of the integrated circuit device. The Zener diode is coupled between a high voltage source and a low voltage source to provide the first reference voltage to a comparator. The comparator compares a first scaled version of the supply voltage and the first reference voltage, and turns on the integrated circuit device if the first scaled version of the supply voltage exceeds the first reference voltage. The Zener diode advantageously consumes less power and takes up less space compared to other active components for generating reference voltage signals.

In one embodiment, the comparator turns off the integrated circuit device if another scaled version of the supply voltage drops below a second reference voltage generated at a bandgap circuit. The second reference voltage generated by the bandgap circuit is less vulnerable to PVT (Process-Voltage-Temperature) variations compared to the first reference voltage obtained from the Zener diode, and therefore, the bandgap circuit produces more stable and accurate reference voltage. The first reference voltage is used temporarily during an initial start-up process. After the bandgap circuit becomes operational, whether the supply voltage drops below a threshold is determined based on the second reference voltage.

In one embodiment, the start-up circuit includes at least two current generators. A first current generator provides current in the bandgap circuit for a first time period after the first scaled version of the supply voltage exceeds the first reference voltage. A second current generator provides current in the bandgap circuit for a second time period after the first time period. The second current generator has current regulating characteristics better than the first current generator.

In one embodiment, a low-dropout voltage generates a third reference voltage. The bandgap circuit generates the second reference voltage based on the third reference voltage.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the present invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Embodiments include a start-up circuit in a switch-mode power converter that employs a Zener diode to provide a reference voltage to reduce power consumption and the size of the start-up circuit. The start-up circuit also includes a coarse current source and a coarse reference voltage signal generator for producing current and reference voltage for initial start-up operation of a bandgap circuit. The reference signal and current from the coarse current source and the reference voltage signal generator are subject to large process-voltage-temperature (PVT) variations or susceptible to noise from power supply, and hence, these signals are used temporarily during start-up and then replaced with signals from higher performance components. After the bandgap circuit becomes operational, the start-up circuit receives a voltage reference signal from the bandgap circuit that is less vulnerable to the PVT variations and noise to more accurately detect undervoltage lockout (UVLO) conditions.

Example Architecture of Switching Power Converter

Figure 2A:
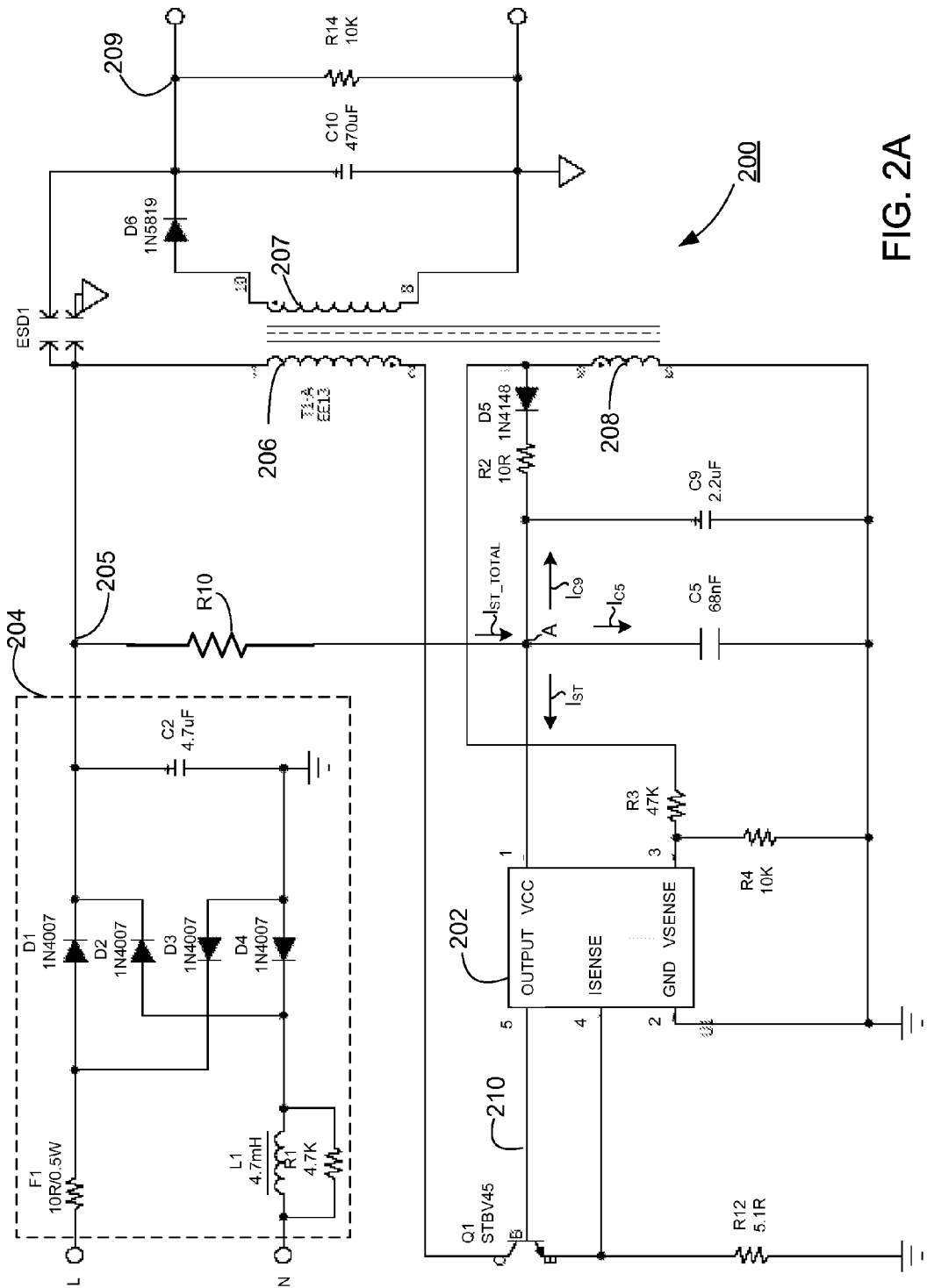
FIG. 2A is a circuit diagram illustrating a switching power converter, according to one embodiment.

FIG. 2A is a circuit diagram illustrating a switching power converter 200, according to one embodiment. The power converter 200 includes three principal sections, i.e., a front end 204, power stage, and a secondary stage. The front end 204 is connected to an AC voltage source (not shown) at nodes L, N, and includes a bridge rectifier comprised of inductor L1, resistors R1, F1, diodes D1, D2, D3, D4, and capacitor C2. The rectified input line-in voltage at node 205 is input to the supply voltage pin Vcc (pin 1) of controller IC 202 via resistor R10. The line-in voltage at node 205 is also connected to the primary winding 206 of power transformer T1-A. Capacitor C5 removes high frequency noise from the rectified line-in voltage. The output of the front end section at node 205 is an unregulated DC input voltage. The switching power converter 200 of FIG. 2A is merely illustrative. Embodiments described herein may be employed in switching power converter of topology or type different from the power converter 200 described in FIG. 2A.

The power stage is comprised of power transformer T1-A, BJT (Bipolar Junction Transistor) power switch Q1, and controller IC 202. Power transformer T1-A includes a primary winding 206, a secondary winding 207, and an auxiliary winding 208. Controller IC 202 maintains output regulation via control of the ON and OFF states of BJT power switch Q1 via a control signal 210 output from the OUTPUT pin (pin 5) of controller IC 202. Control signal 210 drives the base (B) of BJT power switch Q1. The collector (C) of BJT power switch Q1 is connected to the primary winding 206, while the emitter (E) of BJT power switch Q1 is connected to the $I_{SENSE}$ pin (pin 4) of controller IC 202 and to ground via resistor R12. $I_{SENSE}$ pin senses the current through the primary winding 206 and BJT switch Q1 in the form of a voltage across sense resistor R12. Controller IC 202 employs modulation technique to control the ON and OFF states of power switch Q1, the duty cycles of BJT power switch Q1 and the amplitude of the BJT base current. The GND pin (pin 2) of controller IC 202 is connected to ground.

The secondary stage is comprised of diode D6 functioning as an output rectifier and capacitor C10 functioning as an output filter. The resulting regulated output voltage Vout at node 209 is delivered to the load (not shown) and a pre-load R14. The pre-load R14 stabilizes the output of the power converter at no load conditions. Also, ESD discharge gap (ESD1) is coupled between the primary winding 206 and diode D6.

The output voltage Vout at node 209 is reflected across auxiliary winding 208, which is input to the $V_{SENSE}$ pin (pin 3) of controller IC 202 via a resistive voltage divider comprised of resistors R3 and R4. Also, although controller IC 202 is powered up by the line-in voltage at start-up, controller IC 202 is powered up by the voltage across auxiliary winding 208 after start-up and in normal operation. Thus, diode D5 and resistor R2 form a rectifier for rectifying the voltage across auxiliary winding 208 for use as the supply voltage input to the Vcc pin (pin 1) of controller IC 202 after start-up during normal operation. Capacitor C9 is used to hold power from the line-in voltage at node 205 at start-up or from the voltage across auxiliary winding 208 after start-up between switching cycles.

During the initial start-up of the power converter 200, current $I_{ST\_TOTAL}$ from node 205 passes resistor R10 to node A. At node A, current $I_{ST\_TOTAL}$ is split into current $I_{ST}$ to Vcc node of controller IC 202, current $I_{C9}$ for charging up capacitor C9, and current $I_{C5}$ for charging up capacitor C5. Current $I_{ST}$ is consumed by the controller IC 202 to activate a start-up circuit. Current $I_{C5}$ is negligible due to low capacitance of capacitor C5, and hence, the relationship between the current $I_{ST\_TOTAL}$, $I_{ST}$ and $I_{C9}$ can be expressed as:

$$I_{ST\_TOTAL} = I_{ST} + I_{C9} = \frac{Line_{rms} - Vcc}{R10} \qquad \text{equation (1)}$$

where $Line_{rms}$ is line-in voltage at node 205 and Vcc is the supply voltage to controller IC 202. Although it is advantageous to increase $I_{C9}$ to charge the capacitor C9 at a faster speed, current $I_{ST\_TOTAL}$ should also be maintained as low as possible to reduce the power loss, especially when the power converter is in a stand-by mode. Assuming that the capacitance of C9 is 2.2 μg and the required start-up voltage is 10V, the first order calculation for the minimum current $I_{C9}$ for 3 second start-up time of the power converter 200 is as follows:

$$I_{C9} = \frac{C9 \cdot 10 \text{ V}}{3 \text{ sec}} = 7.33 \text{ μA} \qquad \text{equation (2)}$$

To provide current $I_{C9}$ at this level while reducing $I_{ST\_TOTAL}$, current $I_{ST}$ consumed by the start-up circuit may be reduced. Embodiments reduce $I_{ST}$ by using a low leakage Zener diode instead of a low dropout (LDO) regulator to provide a reference voltage.

Example Architecture of Controller Integrated Circuit

Figure 2B:
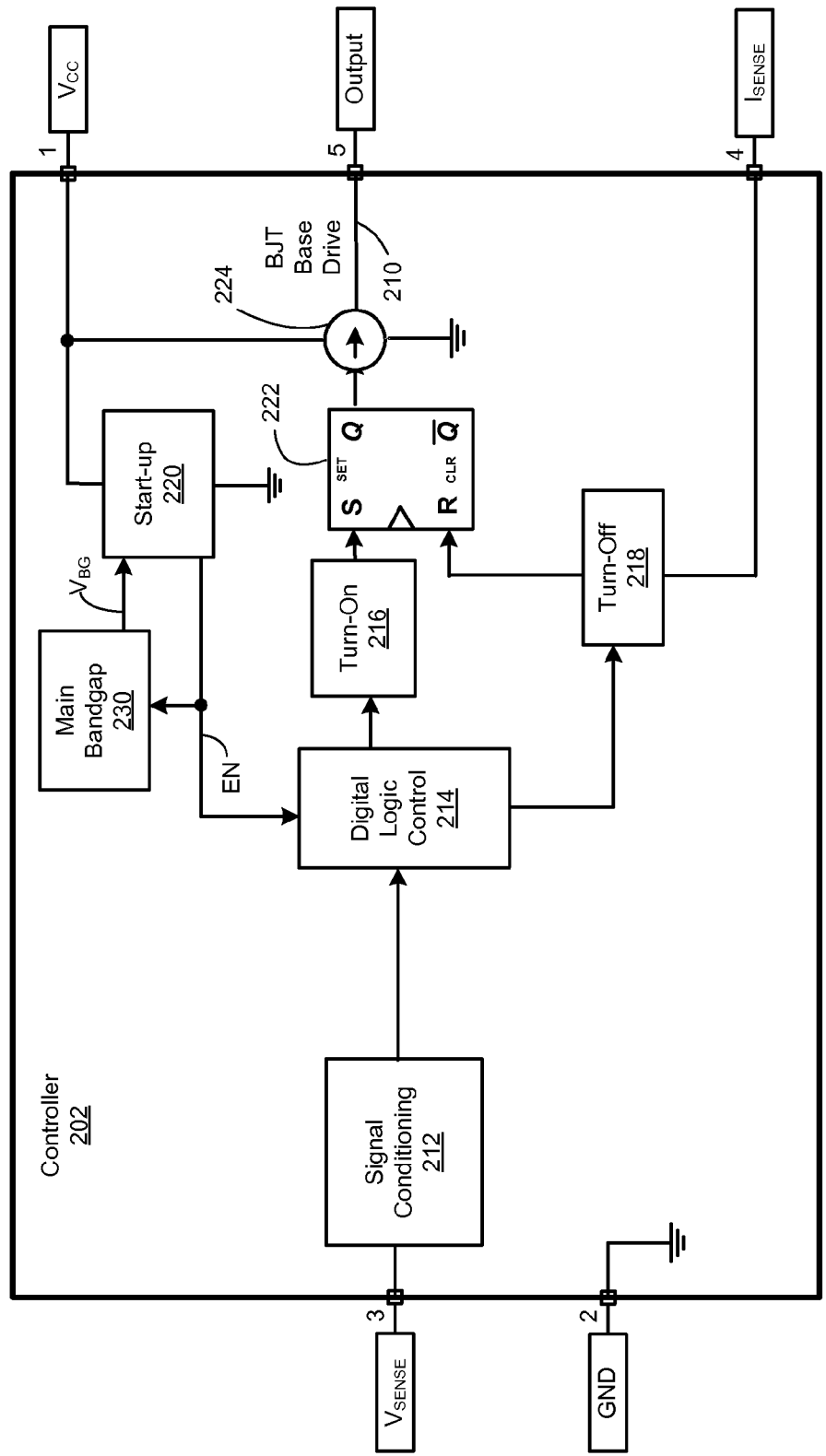
FIG. 2B is a block diagram illustrating the internal circuitry of the controller of the switching power converter in more detail, according to one embodiment.

FIG. 2B is a block diagram illustrating the internal circuitry of the controller IC 202 of the switching power converter 200 in more detail, according to one embodiment. Controller IC 202 receives analog parameters such as the $V_{SENSE}$ voltage at pin 3 and the $I_{SENSE}$ voltage at pin 4, but adaptively processes these parameters using digital circuitry and digital state machines to generate the appropriate base drive signal at pin 5 (Output). Controller IC 202 includes a number of main circuit blocks, including start-up circuit 220, main bandgap circuit 230, signal conditioning block 212, digital logic control 214, turn-on logic block 216, turn-off logic block 218, SR flip flop 222, Ipeak comparator 228, and BJT base driver 224. Controller IC 202 regulates the output voltage Vout and output current Iout of the switching power converter 200 by means of adaptive digital, primary-side feedback control. Sensing the primary-side current at the $I_{SENSE}$ pin (pin 4) allows cycle-by-cycle peak current control and limit in both constant voltage (CV) and constant current (CC) modes as well as precise constant current (output current Iout) control that is insensitive to the magnetizing inductance Lm of the transformer T1-A. Sensing the output voltage Vout reflected across the auxiliary winding 208 at the $V_{SENSE}$ pin (pin 3) allows for precise output voltage regulation.

Start-up circuit 220 generates an enable signal (EN) when supply voltage Vcc voltage is built up to a voltage higher than a predetermined start-up voltage ST_V, and turns off the EN signal when the supply voltage Vcc drops below an Under-voltage Lockout voltage (UVLO voltage), as described below in detail with reference to FIG. 3A. Supply voltage Vcc is a scaled-down version of the line-in voltage at node 205. EN signal is sent to main bandgap circuit 230 and digital logic control 214 to turn on the main bandgap block 230 and the digital logic control 214. After receiving EN signal, main bandgap block 230 starts to generate a reference voltage $V_{BG}$ that is used by components of controller IC 202 as a reference voltage. After receiving EN signal, digital logic control block 204 initiates a turn-on command to turn-on logic block 216 to set SR flip flop 222, causing BJT base drive current generator 224 to generate a base drive current 210 via the OUTPUT pin (pin 5) to turn on the BJT power switch Q1. Controller IC 202 then receives feedback information on the output voltage Vout as reflected on auxiliary winding 208 via the $V_{SENSE}$ pin (pin 3).

Signal conditioning block 212 receives the $V_{SENSE}$ voltage and generates a variety of voltage and current feedback parameters for use by digital logic control block 214. Signal conditioning block 212 generates a variety of information. The information generated by signal conditioning block 212 is used by turn-on logic block 216 and turn-off logic block 218 to operate SR flip flop 222 and BJT base driver 224. BJT base drive current 210 turns on or off BJT power switch Q1.

Example Start-up Circuit

Figure 3A:
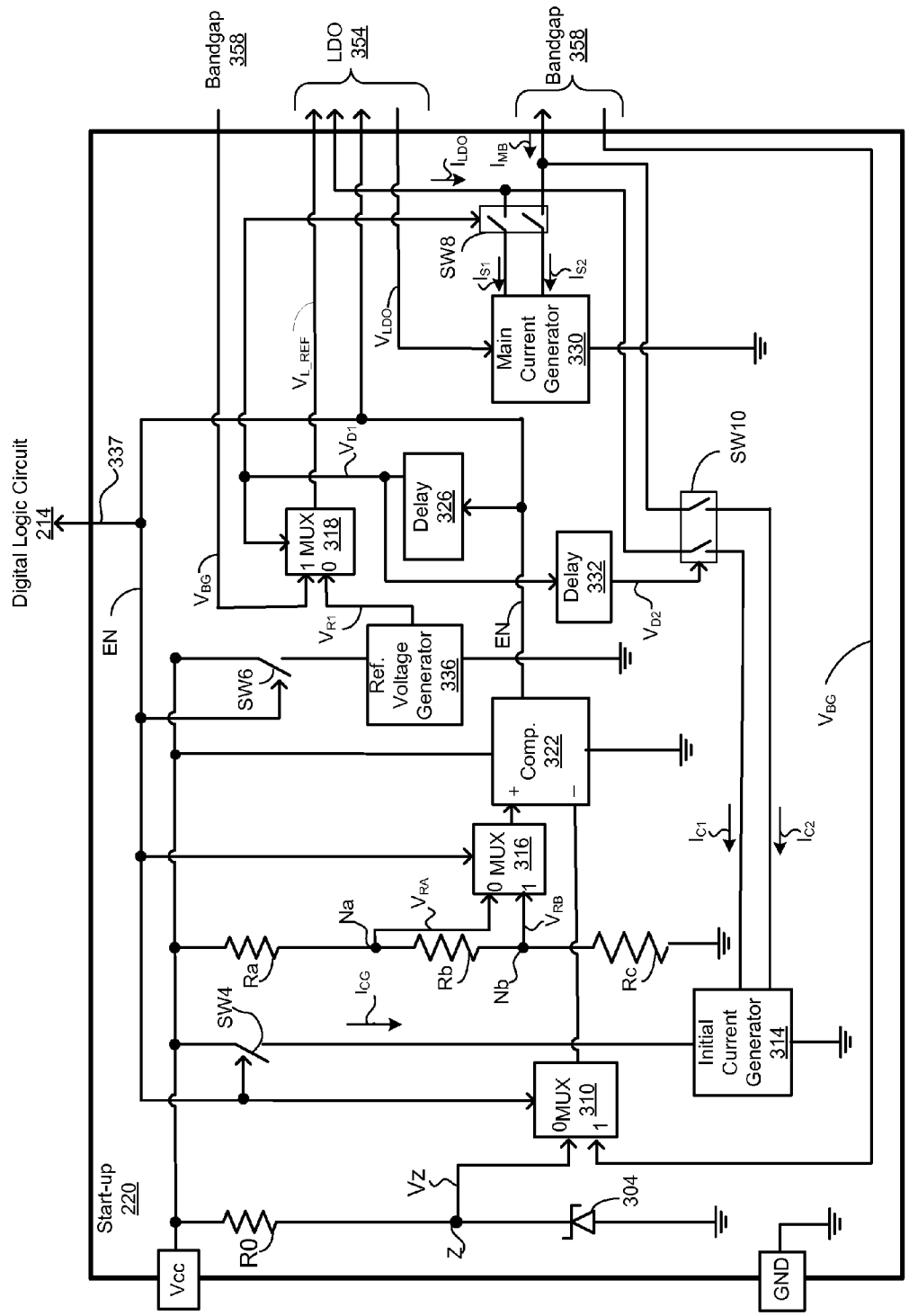
FIG. 3A is a block diagram illustrating a start-up circuit in the controller of the switching power converter, according to one embodiment.

FIG. 3A is a block diagram illustrating start-up circuit 220 in controller IC 202 of the switching power converter 200, according to one embodiment. Startup-up circuit 220 generates EN signal when supply voltage $V_{CC}$ is higher than a predetermined start-up voltage ST_V, and turns off the EN signal when supply voltage Vcc drops below a preset UVLO voltage. In one embodiment, the start-up voltage ST_V and the UVLO voltage are set to 10V and 4V, respectively.

One of many important modifications in the embodiment of FIG. 3A is the replacement of an LDO with low leakage Zener diode 304. Before start-up of the controller IC 202 (e.g., when the power converter is coupled to a power source), EN signal is turned off (EN is low), which causes multiplexer 310 to connect node Z to the inverted input of comparator 322. As supply voltage Vcc increases above Vz, Zener diode 304 clamps the voltage at node Z to a fixed voltage Vz. In one embodiment, voltage Vz is approximately 6.2V.

Sensing resistors Ra, Rb and Rc are coupled between supply voltage Vcc and ground (GND) and functions as a voltage divider. During the initial start-up, the multiplexer 316 connects node Na to the non-inverted input of the comparator 322. Hence, voltage ($V_{RA}$=Vcc·Ra/(Ra+Rb+Rc)) across resistor Ra is received at the non-inverted input of the comparator 322. The comparator 322 compares voltage $V_{RA}$ and voltage $V_Z$, and generates EN signal when $V_{RA}$ exceeds voltage $V_Z$.

Initial current generator 314 functions as a low performance current source that temporarily regulates current in main bandgap circuit 230 during the start-up of the controller IC 202. An example circuit of initial current generator 314 is described below in detail with reference to FIG. 3B. Switch SW4 is turned on when EN signal is turned on. Voltage signal $V_{D2}$ is initially turned on and remains on for a period ($T_{D1}$+

$T_{D2}$), as described below in detail with reference to FIG. 4. As a result, initial current generator 314 starts to generate current $I_{C1}$ and current $I_{C2}$ in main bandgap circuit 230 after EN signal is turned on and before $V_{D2}$ is turned off.

Main current generator 330 also generates current $I_{S1}$ and $I_{S2}$ after LDO 354 starts to generate output voltage $V_{LDO}$. Main current generator 330 has better current regulating characteristics compared to initial current generator 314. That is, main current generator 330 is less vulnerable changes from PVT variations or noise compared to initial current generator 314. During period $T_{D1}+T_{D2}$, both the main current generator 330 and the initial current generator 314 may generate current $I_{MB}$ and $I_{LDO}$ in main bandgap circuit 230. After period $T_{D1}+T_{D2}$ elapses, delay signal $V_{D2}$ is turned off, which in turn turns off switch SW10 connected to initial current generator 314. Turning off switch SW10 shuts off initial current generator 314 and allows main current generator 330 with better current regulating characteristics to regulate current $I_{MB}$ and $I_{LDO}$ of bandgap circuit 230. In one embodiment, main current generator 330 is embodied, as described below in detail with reference to FIG. 3E.

Turning on of EN signal prompts, among others, the following operations: (i) switch SW6 is turned on to connect reference voltage generator 336 to supply voltage Vcc, (ii) multiplexer 316 disconnects node Na to the non-inverting input of comparator 322 and connects node Nb to the non-inverting input of comparator 322, (iii) multiplexer 310 connects the inverted input of comparator 322 to the output of bandgap block 358, (iv) switch SW4 is turned on to connect initial current generator 314 to supply voltage Vcc, (v) LDO 354 is turned on in main bandgap circuit 230, (vi) other components of controller IC 202 such as digital logic circuit 214 are turned on, (vii) delay module 326 starts to generate first delay signal $V_{D1}$ after period $T_{D1}$ passes, and (viii) delay module 332 switches off delay signal $V_{D2}$ after period $T_{D1}+T_{D2}$ passes. Each of these operations is described in more detail herein.

When EN signal is turned on, switch SW6 is turned on to connect the reference voltage generator 336 to supply voltage Vcc. As a result, the reference voltage generator 336 provides a coarse reference voltage $V_{R1}$ that may be used temporarily as reference voltage $V_{L\_REF}$ for LDO 354 while bandgap block 358 is not yet operational. An example circuit of reference voltage generator 336 is described below in detail with reference to FIG. 3C. After period $T_{D1}$ passes, multiplexer 318 is switched so that reference voltage $V_{BG}$ from bandgap block 358 is provided to LDO 354 as reference voltage $V_{L\_REF}$ instead of $V_{R1}$.

EN signal also switches multiplexer 316 so that node Nb (instead of node Na) is coupled to the non-inverting input of the comparator 322. Hence, the non-inverting input of the comparator 322 receives voltage $V_{BG}$ (which equals Vcc·(Ra+Rb)/(Ra+Rb+Rc)). EN signal also switches multiplexer 310 so that the inverted input of the comparator 322 is connected to receive reference voltage $V_{BG}$ from bandgap block 358. Reference voltage $V_{BG}$ is more reliable and less susceptible to PVT variations than $V_Z$, and hence, it is advantageous to use $V_{BG}$ as a reference voltage instead of $V_Z$. By switching the multiplexers 310 and 316, comparator 322 now operates to detect dropping of supply voltage Vcc below UVLO voltage. The use of $V_{BG}$ as the reference voltage of the comparator 322 allows more accurate detection of UVLO conditions.

EN signal also turns switch SW4 that connects initial current generator 314 to supply voltage Vcc. In response, initial current generator 314 becomes operational. Delay signal $V_{D2}$ is initially turned on, and therefore, initial current generator 314 starts to generate current $I_{C1}$ and $I_{C2}$ after EN signal is turned on.

Figure 3C:
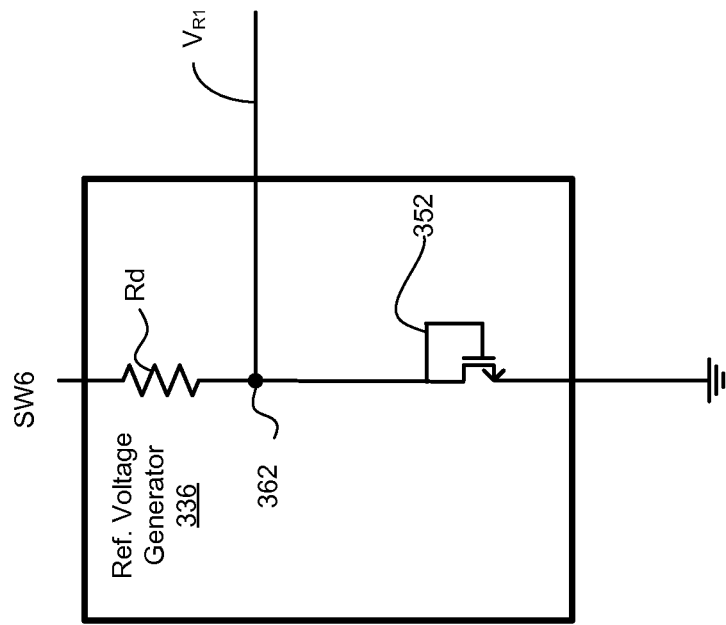
FIG. 3C is a block diagram illustrating a reference voltage generator in the start-up circuit, according to one embodiment.
Figure 3B:
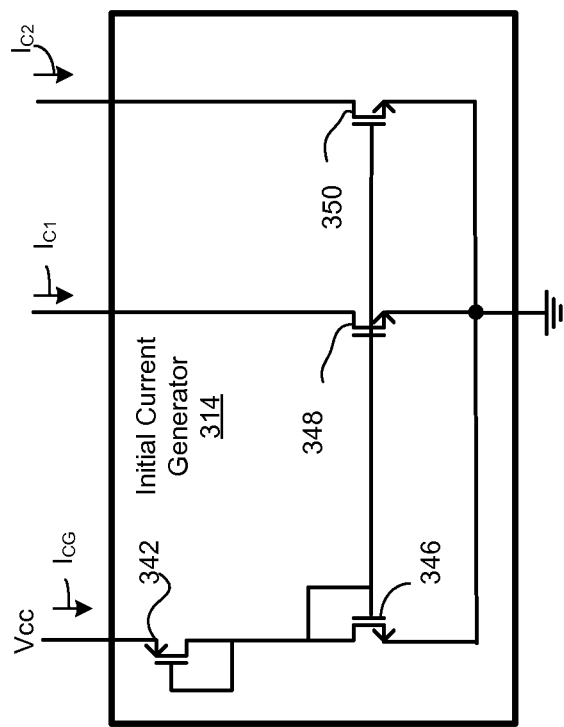
FIG. 3B is a block diagram illustrating an initial current generator in the start-up circuit, according to one embodiment.
Figure 3E:
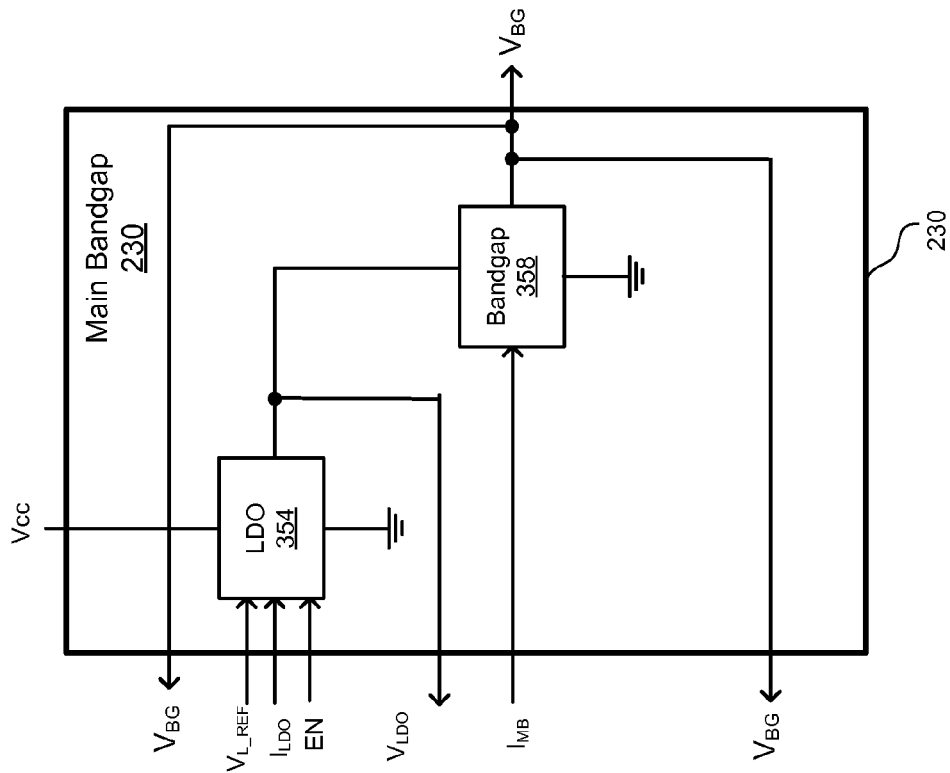
FIG. 3E is a block diagram illustrating a main bandgap circuit connected to the start-up circuit of FIG. 3A, according to one embodiment.
Figure 3D:
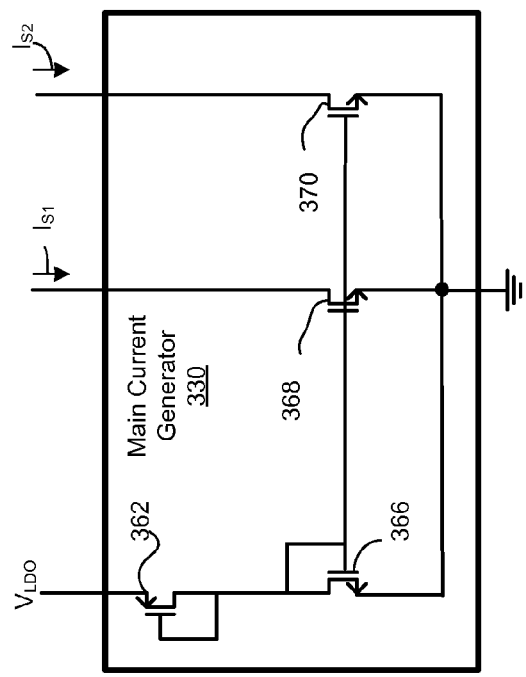
FIG. 3D is a block diagram illustrating a main current generator in the start-up circuit, according to one embodiment.

Referring to FIG. 3D, LDO 354 in main bandgap circuit 230 is also turned on by EN signal. After EN signal is turned on and before period $T_{D1}$ passes, LDO 354 receives $V_{R1}$ and generates regulated voltage signal $V_{LDO}$ that is fed to main current generator 330 and bandgap block 358. After receiving $V_{LDO}$, main current generator 330 starts to operate. However, there may be some time lag after main current generator 330 receives $V_{LDO}$ and starts to produce current $I_{S1}$ and current $I_{S2}$. Hence, switch SW8 remains turned off until period $T_{D1}$ elapses at which time switch SW8 is turned on to generate current $I_{S1}$ and current $I_{S2}$. Before period $T_{D1}$ passes, current $I_{MB}$ ($=I_{C2}$) is generated by initial current generator 314 to operate bandgap block 358. After period $T_{D1}$ passes and before period $T_{D1}+T_{D2}$ passes, multiplexer 318 and switch SW8 are operated so that LDO 354 now receives $V_{BG}$ as voltage reference signal instead of $V_{R1}$.

Delay modules 332 and 326 dynamically switch voltage reference signals and current sources for main bandgap circuit 230 to improve accuracy of bandgap voltage $V_{BG}$. In one embodiment, delay modules 332 and 326 are embodied as inverters coupled in series. The amount of time delay is determined by, among other factors, the number of inverters connected in series. After EN signal is received at delay module 326, delay module 326 turns on first delay signal $V_{D1}$ after period $T_{D1}$. First delay signal $V_{D1}$ causes multiplexer 318 to connect the output $V_{BG}$ of the bandgap block 358 to an input of LDO 354 in bandgap circuit 230 and to disconnect the output of the reference voltage generator 336 from the input of the LDO 354. Period $T_{D1}$ is of sufficient length to ensure that bandgap block 358 in main bandgap circuit 230 becomes fully operational, and hence, reference voltage $V_{BG}$ generated by the bandgap block 358 becomes more reliable and accurate than the voltage signal $V_{R1}$ to function as reference voltage $V_{L\_REF}$ for LDO 354.

First delay signal $V_{D1}$ also turns on switch SW8, causing current $I_{S1}$ and current $I_{S2}$ to be generated by main current generator 330. Period $T_{D1}+T_{D2}$ may not be a sufficient time for main current generator 330 to become fully operational. Although main current generator 330 may start producing current $I_{S1}$ and $I_{S2}$ after SW8 is turned on by delay signal $V_{D1}$, current $I_{S1}$ and $I_{S2}$ may be insufficient to sustain the operation of LDO 354 and bandgap 358. Hence, initial current generator 314 may continue to generate current $I_{C1}$ and current $I_{C2}$ until switch SW10 is turned off (i.e., when period $T_{D1}+T_{D2}$ expires). During period $T_{D1}+T_{D2}$, current $I_{LDO}$ in LDO 354 equals the sum of current $I_{S1}$ and current $I_{C1}$, and current $I_{MB}$ in bandgap block 358 equals the sum of current $I_{S2}$ and current $I_{C2}$.

First delay signal $V_{D1}$ is also fed to delay module 332, which prompts delay module 332 to turn off second delay signal $V_{D2}$ after period $T_{D2}$ passes. When second delay signal $V_{D2}$ is turned off, switch SW10 is also turned off. By turning off switch SW10, the output of initial current generator 314 is disconnected from main bandgap circuit 230. Period $T_{D1}$ and $T_{D2}$ are set to ensure proper operation of main current generator 330. Hence, after period $T_{D1}+T_{D2}$, initial current generator 314 with low performance no longer generates any current in main bandgap circuit 230 and only main current generator 330 generates current in main bandgap circuit 230.

When supply voltage Vcc drops below UVLO voltage during the operation of the power converter 200, the comparator 322 turns off EN signal. In response, LDO 354 shuts off $V_{LDO}$ and bandgap block 358 stops producing $V_{BG}$. EN signal also switches multiplexer 310, coupling node Z to the inverted input of comparator 322. The delay module 326 also turns off $V_{D1}$ after period $T_{D3}$, causing multiplexer 318 to connect reference voltage generator 336 to LDO 354 and to turn off switch SW8 to disconnect main current generator 330 from LDO 354 and bandgap block 358. After period $T_{D4}$ passes, $V_{D2}$ is turned high, which connects initial current generator 314 to LDO 354 and bandgap block 358. In this way, the start-up circuit 220 is reset to detect the start-up voltage and restart the start-up process.

FIG. 3B is a block diagram illustrating initial current generator 314 for temporarily generating current $I_{C1}$ for LDO 354 and current $I_{C2}$ for bandgap block 358 during period $T_{D1}$+$T_{D2}$, according to one embodiment. Initial current generator 314 includes a PMOS 342 and NMOS 346, 348 and 350. PMOS 342 functions as a diode that allows current $I_{CG}$ from switch SW4 to flow to initial current generator 314 but not in a reverse direction. NMOS 346, 348 and 350 form a current mirror that generates tail current $I_{C1}$ and $I_{C2}$ that is proportional to $I_{CG}$.

Initial current generator 314 is operated by supply voltage Vcc that is a scaled-down version of line-in voltage. Hence, tail current $I_{C1}$ and tail current $I_{C2}$ generated by initial current generator 314 are subject to noise in line-in voltage and may not be reliable for extended operation of power converter 200. Main current generator 330 generates current $I_{S1}$ and current $I_{S2}$ that are more stable and less susceptible to external noise, as described below in detail with reference to FIG. 3E. Therefore, after main current generator 330 becomes operational, current $I_{S1}$ and $I_{S2}$ are used in lieu of current $I_{C1}$ and $I_{C2}$. Initial current generator 314 of FIG. 3B is merely illustrative. Various other types of simple current generators may be used as initial current generator 314.

FIG. 3C is a block diagram illustrating reference voltage generator 336 in the start-up circuit 220 for temporarily providing reference voltage signal $V_{R1}$ to LDO 354 during period $T_{D1}$, according to one embodiment. Reference voltage generator 336 is comprised of resistor Rd and NMOS 352 that are serially connected between supply voltage Vcc and ground GND. NMOS 352 functions as a diode that clamps voltage $V_{R1}$ at node 362 to $V_{R1}$. NMOS 352 and resistor Rd are susceptible to PVT variations, and hence, voltage $V_{R1}$ is not reliable for extended operation of power converter 200. Hence, voltage $V_{R1}$ functions as a reference voltage for LDO 354 temporarily before bandgap block 358 becomes operational. Reference voltage generator 336 of FIG. 3C is merely illustrative. Various other types of current generators may be used as reference voltage generator 336.

FIG. 3D is a block diagram illustrating an example circuit of main current generator 330, according to one embodiment. Main current generator 330 is comprised of a PMOS 362 and NMOS 366, 368 and 370. PMOS 362 functions as a diode. NMOS 366, 368 and 370 form a current mirror that generates tail current $I_{S1}$ and $I_{S2}$. LDO 354 functions as a power supply that provides voltage $V_{LDO}$ to main current generator 330 that is more stable and isolated from noise in supply voltage Vcc. Hence, current $I_{S1}$ and current $I_{S2}$ are more stable and less susceptible to external noise compared to current $I_{C1}$ and $I_{C2}$ generated by initial current generator 314. Main current generator 330 of FIG. 3E is merely illustrative. Various other types of simple current generators may be used as main current generator 330.

Example Main Bandgap Circuit

FIG. 3E is a block diagram illustrating main bandgap circuit 230 connected to the start-up circuit 220 of FIG. 3A, according to one embodiment. The main bandgap circuit 230 is comprised of LDO 354 and bandgap block 358. LDO 354 functions as a voltage regulator for operating bandgap block 358. LDO 354 is embodied using a conventional circuit that is well known in the art, and therefore, the detailed description of its circuitry and operation is omitted herein for the sake of brevity.

Bandgap block 358 is connected to the output of LDO 354 to receive regulated voltage $V_{LDO}$. Further, bandgap block 358 is connected to initial current generator 314 at start-up and then connected to main current generator 330 to generate current $I_{MB}$ for its operation. Circuitry of bandgap block 358 provides accurate reference voltage $V_{BG}$ to various components in controller IC 202 that require a reference voltage. Circuitry of bandgap block 358 is well known in the art, and therefore, the detailed description of its circuitry and operation is omitted herein for the sake of brevity.

Figure 4:
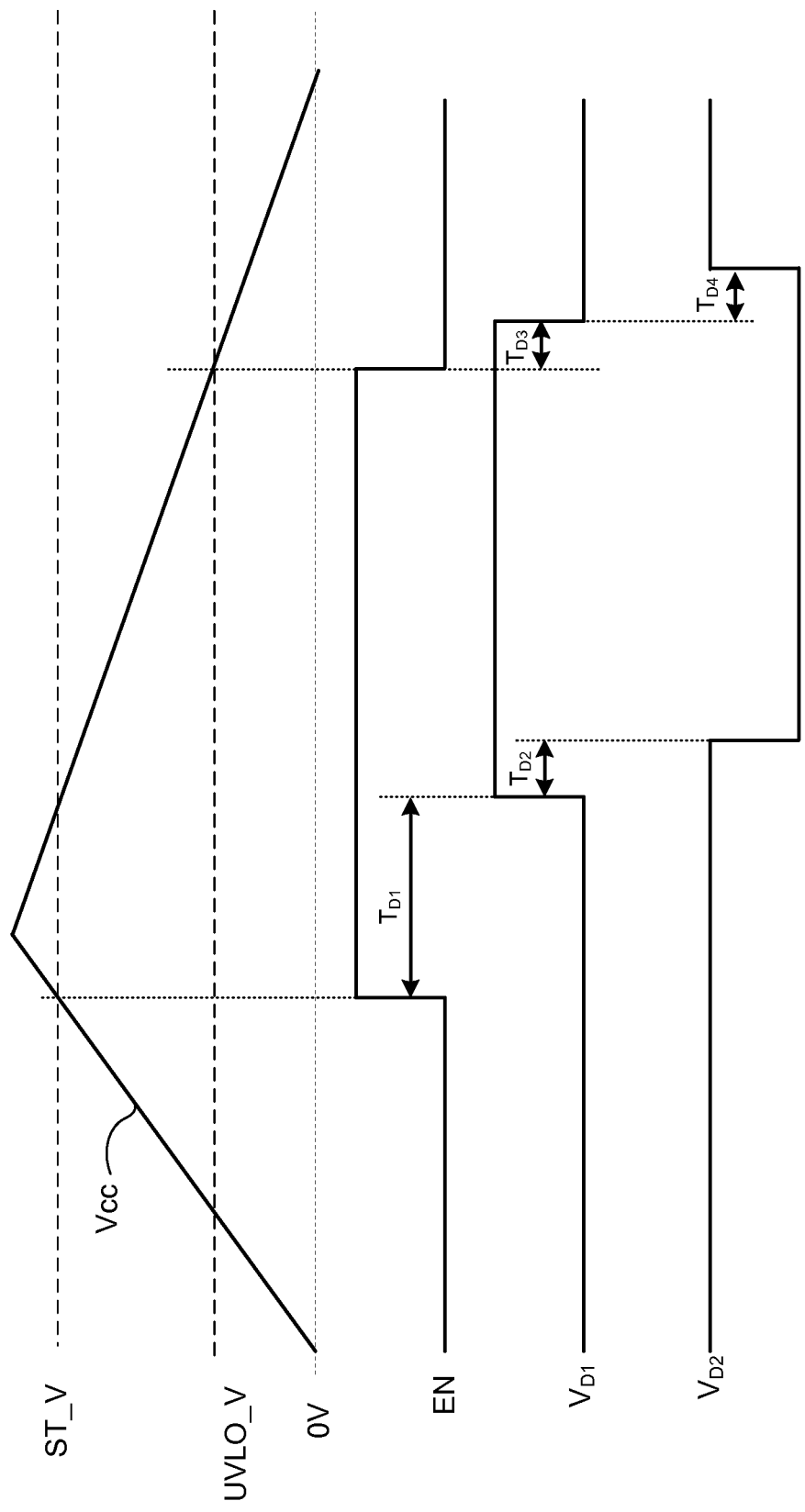
FIG. 4 is a timing diagram of signals in the start-up circuit of FIG. 3A, according to one embodiment.

Timing Diagram of Start-up Circuit FIG. 4 is a timing diagram of signals in start-up circuit 220 of FIG. 3A, according to one embodiment. As supply voltage Vcc ramps up to start-up voltage ST_V, comparator 322 generates EN signal (EN signal turns from low to high). EN signal is fed to delay module 326 that generates first delay signal $V_{D1}$ ($V_{D1}$ turns from low to high) after period $T_{D1}$. Period $T_{D1}$ is set to allow sufficient time for bandgap block 358 to start producing reference voltage $V_{BG}$. In one embodiment, period $T_{D1}$ is approximately 50 µs.

The delay signal $V_{D1}$ is then fed to delay module 332 that turns off second delay signal $V_{D2}$ ($V_{D2}$ turns from high to low) after period $T_{D2}$, finishing the start-up process. Period $T_{D2}$ provides sufficient time for main current generator 330 to start producing sufficient current to sustain the operation of LDO 354 and bandgap block 358. In one embodiment, period $T_{D2}$ is approximately 10 µs.

As supply voltage Vcc starts to drop and reach UVLO voltage (UVLO_V), the comparator 322 turns off EN signal (EN signal turns from high to low). After EN signal is turned off and period $T_{D3}$ passes, delay module 326 turns off the first delay signal $V_{D1}$ ($V_{D1}$ turns from high to low). Turning off of $V_{D1}$ signal prompts second delay signal $V_{D2}$ to turn on ($V_{D2}$ turns from low to high) after period $T_{D4}$, resetting the start-up circuit 220 for next start-up operation.

Operation of Start-up Circuit

Figure 5:
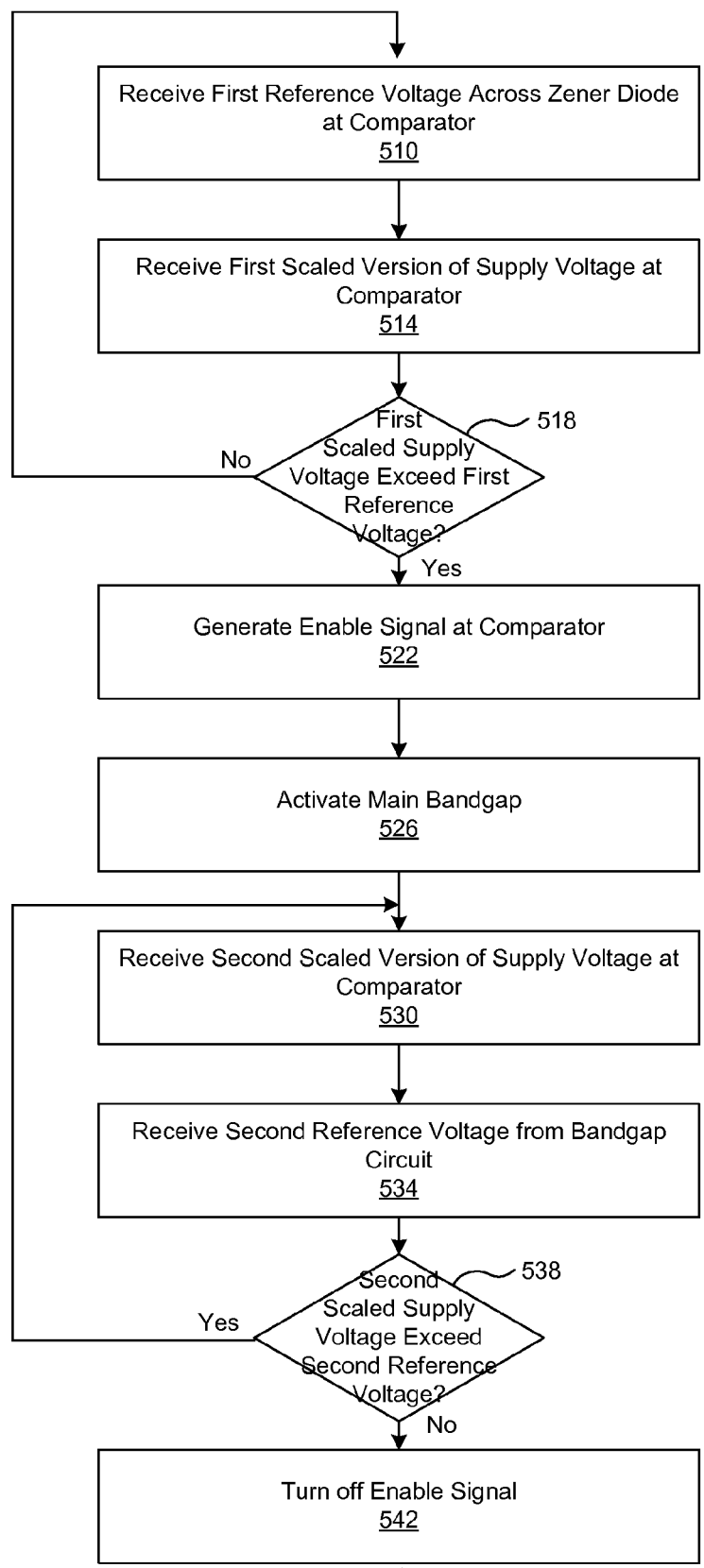
FIG. 5 is a flowchart illustrating an overall process of operation at the start-up circuit, according to one embodiment.

FIG. 5 is a flowchart illustrating an overall process of operation at the start-up circuit 220, according to one embodiment. Initially, comparator 322 does not generate EN signal. Comparator 322 receives 510 a first reference voltage (e.g., Vz across Zener diode 304). Comparator 322 also receives 514 a first scaled version of the supply voltage (e.g., voltage V at node Na). It is then determined 518 whether the first scaled supply voltage exceeds the first reference voltage. In one embodiment, the first scaled supply voltage and the first reference voltage are set so that the first scaled supply voltage equals the first reference voltage when the supply voltage corresponds to a predetermined start-up voltage ST_V. If the first scaled supply voltage does not exceed the first reference voltage, the process returns to receiving 510 the first reference voltage and repeats the subsequent processes.

If the first scaled supply voltage exceeds the first reference voltage, the process proceeds to generate 522 enable signal EN at comparator 322. Enable signal EN performs various operations including activation of digital logic circuit 214. Enable signal EN also activates 526 main bandgap circuit 230, as described below in detail with reference to FIG. 6

Comparator 322 receives a second scaled version of supply voltage (e.g., voltage $V_{RB}$ at node $N_b$). Comparator 322 also receives a second reference voltage (e.g., output voltage $V_{BG}$ from bandgap block 358). If is then determined 538 whether the second scaled supply voltage exceeds the second reference voltage. In one embodiment, the second scaled supply voltage and the second reference voltage are set so that the second scaled supply voltage equals the second reference voltage when the supply voltage corresponds to a predetermined UVLO voltage. If the second scaled supply voltage exceeds the second reference voltage, the process returns to receiving 530 the second scaled version of the supply voltage and repeats the subsequent processes.

If it is determined that the second scaled supply voltage does not exceed the second reference voltage, the process proceeds to turn off 542 enable signal EN and turn off the circuit.

The sequence and steps illustrated in FIG. 5 are merely illustrative. For example, receiving 514 the first scaled version of the supply voltage may precede receiving 510 of the first reference voltage. Further, receiving 534 the second reference voltage may precede receiving 530 the second scaled version of the supply voltage.

Figure 6:
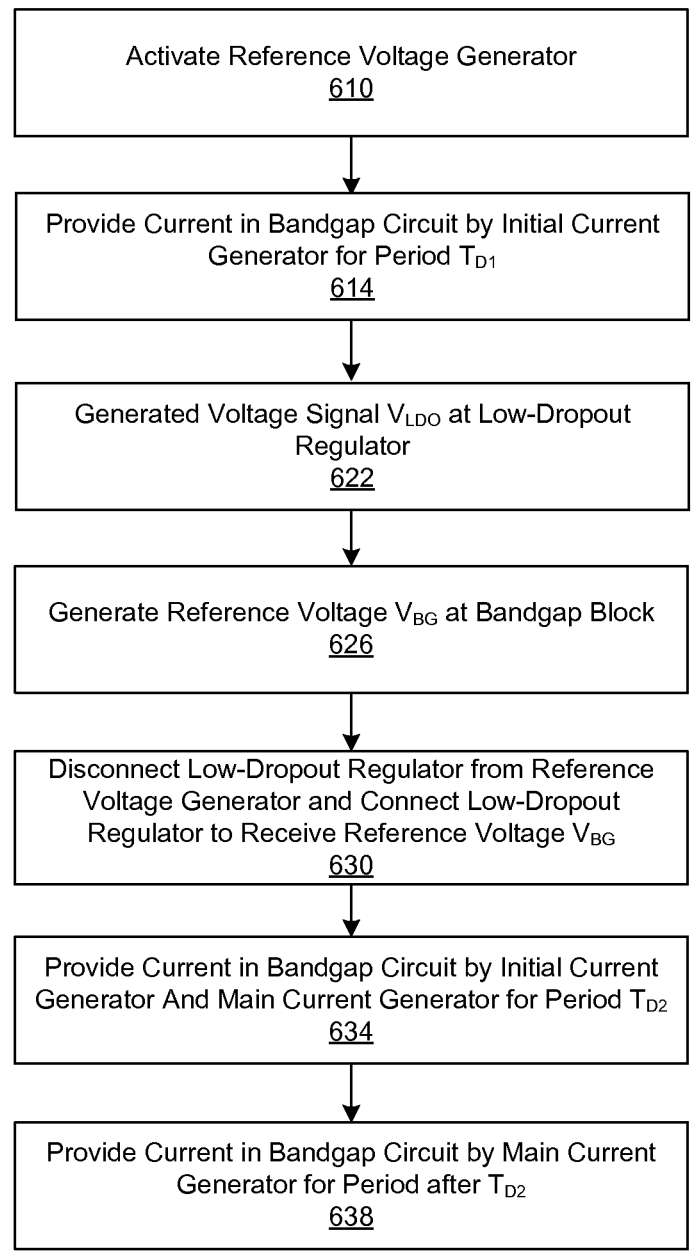
FIG. 6 is a flowchart illustrating a process of activating a main bandgap circuit, according to one embodiment.

FIG. 6 is a flowchart illustrating a process of activating the main bandgap circuit 230, according to one embodiment. After enable signal EN is turned on, switch SW6 connects reference voltage generator 336 to the supply voltage. In response, reference voltage generator 336 is activated 610 to provide coarse reference voltage $V_{R1}$ to LDO 354 via multiplexer 318.

To enable LDO 354 and bandgap block 358 to operate, initial current generator 314 provides 614 current in LDO 354 and bandgap block 358 during time period $T_{D1}$. LDO 354 generates 622 voltage signal $V_{LDO}$ based on reference voltage $V_{R1}$, enable signal EN and current provided by initial current generator 314. Bandgap block 358 also generates 626 output voltage $V_{BG}$ based on voltage signal $V_{LDO}$ from LDO 354.

During period $T_{D2}$, bandgap block 358 starts producing stable output voltage $V_{BG}$. Hence, LDO 354 is disconnected 630 from reference voltage generator 336 and is instead connected to bandgap block 358 via multiplexer 318 to receive output voltage $V_{BG}$. Also, LDO 354 and bandgap block 358 are operated by current provided 634 by both initial current generator 314 and main current generator 330.

After time period $T_{D2}$, the main current generator 330 becomes fully operational. Hence, the main bandgap circuit 230 is disconnected from the initial current generator 314 and provided 638 with current by the main current generator 330.

Power Consumption Comparison

Figure 1:
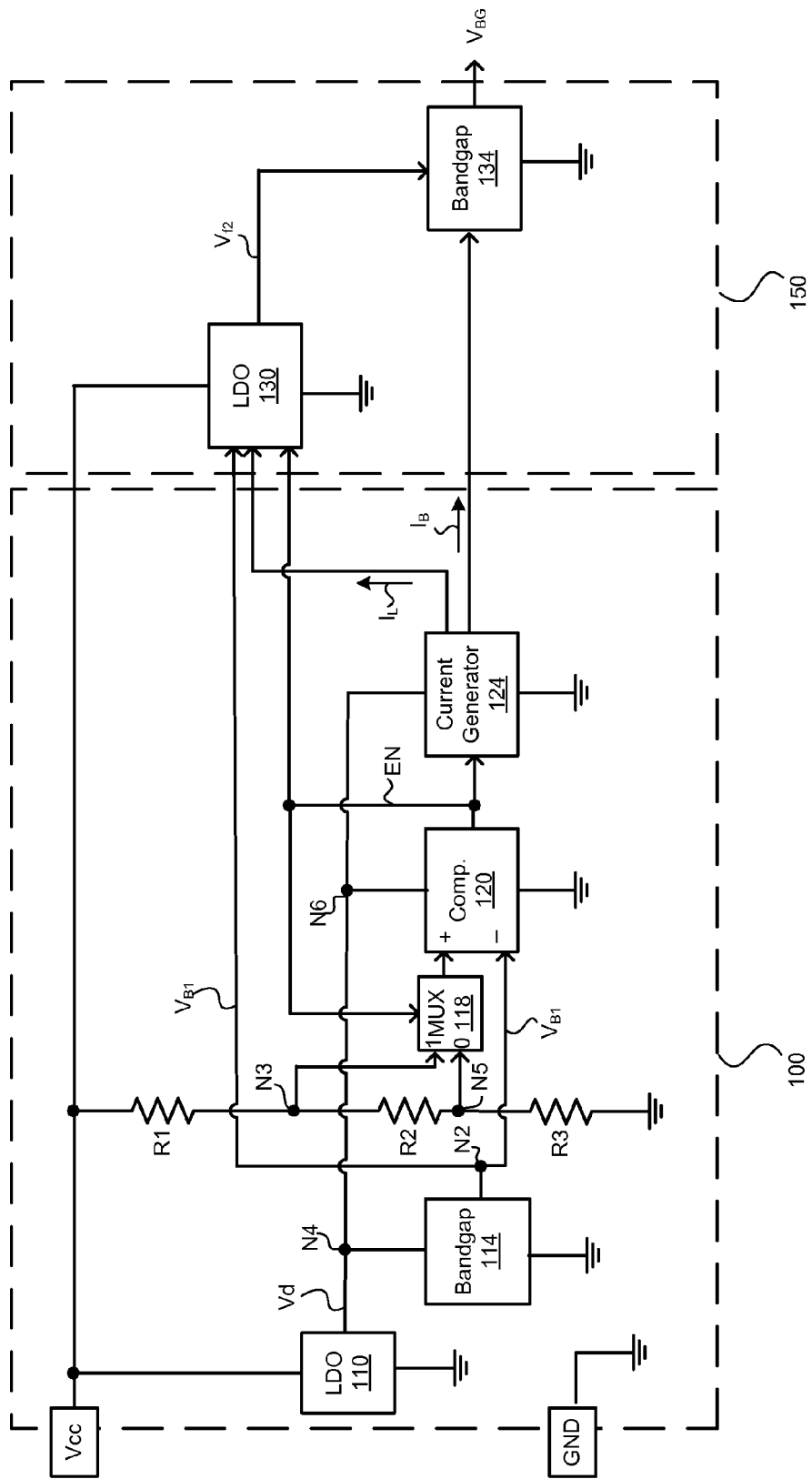
FIG. 1 is a circuit diagram illustrating a conventional start-up circuit and a main bandgap circuit.

In conventional start-up circuits using an LDO, about 10 µA is used by the start-up circuit. The reduction in consumed current significantly reduces the energy loss of the power converter at start-up and in no-load conditions. Assume, for example, that (i) the power converter 200 must be started up within 3 seconds, (ii) the start-up voltage is 10V, (iii) the lowest line-in voltage is 85V, and (iv) the highest line-in voltage is 265V. The slowest charge-up of capacitor C9 occurs at the lowest line-in voltage (85V), and resistance of R10 is governed by the charge time of capacitor C9 at the lowest line-in voltage. In this case, $I_{C9}$ (see FIG. 2A) is 7.33 µA according to equation (2). Conventional start-up circuit of FIG. 1 uses current $I_{ST1}$ of about 10 µA, and hence, R10 (see FIG. 2A) is calculated as below:

$$R10 = \frac{\text{low\_line}_{rms} - \text{ST\_V}}{I_{c9} + I_{ST1}} = \frac{120 - 10}{7.33 + 10} = 6.35 \text{ M}\Omega \quad \text{equation (3)}$$

The maximum energy loss occurs when the line-in voltage is the highest. Hence, the maximum energy loss during no-load conditions for conventional circuit attributable to resistor R10 is as follows:

$$loss_{high\_line1} = \quad \text{equation (4)}$$
$$\frac{(\text{high\_line}_{rms} - \text{ST\_V})^2}{R10} = \frac{(374-10)^2}{6.35} = 20.9 \text{ mW}$$

Compare this with an embodiment of FIG. 3A that uses current $I_{ST2}$ of about 1 µA. By using a Zener diode instead of an LDO, embodiments of the present invention may use as low as 1 µA of current in the start-up circuit. In this case, R10 (see FIG. 2A) can be computed by the following equation:

$$R10 = \frac{\text{low\_line}_{rms} - \text{ST\_V}}{I_{c9} + I_{ST2}} = \frac{120 - 10}{7.33 + 1} = 13.2 \text{ M}\Omega \quad \text{equation (5)}$$

Hence, the maximum energy loss attributable to resistor R10 for the embodiment of FIG. 3A can be calculated as follows:

$$loss_{high\_line2} = \quad \text{equation (6)}$$
$$\frac{(\text{high\_line}_{rms} - \text{ST\_V})^2}{R_{10}} = \frac{(374-10)^2}{13.2} = 10.0 \text{ mW}$$

In this example, the maximum energy loss of the circuit of FIG. 3A attributable to resistor R10 of FIG. 2A is less than 50% of conventional start-up circuit.

Alternative Embodiments

Although embodiments are described herein with reference to a power converter and a controller IC in the power converter, the embodiments may be used in various electric devices and are not limited to power converters and controller ICs.

Upon reading this disclosure, those of skill in the art will appreciate still additional alternative designs for switching power converters. For example, the controller IC 202 may be implemented as an analog circuit generating the control signal 210 based on analog signal processing.

Although the controller IC 202 and its application circuit shown in FIG. 2A are based on the primary-side feedback control, the same principle of this invention is also applicable to alternative designs based on the conventional secondary-side feedback control.

In one embodiment, a MOSFET (metal-oxide-semiconductor field-effect transistor) switch issued in place of BJT switch Q1.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the present invention.

The invention claimed is:

1. A method for turning on or off an integrated circuit device, comprising:
   receiving supply voltage from a high voltage source;
   receiving a first reference voltage across a Zener diode coupled between a high voltage source and a low voltage source;

turning on the integrated circuit device responsive to a first scaled version of the supply voltage exceeding the first reference voltage;

turning off the integrated circuit device responsive to a second scaled version of the supply voltage dropping below a second reference voltage generated at a bandgap circuit;

providing current in the bandgap circuit by a first current generator for a first time period after the first scaled version of the supply voltage exceeds the first reference voltage;

providing current in the bandgap circuit by a second current generator for a second time period after the first time period, the second current generator having current regulating characteristics better than the first current generator; and providing current in the bandgap circuit by the first current generator and the second current generator for a third time period after the first period and before the second time period.

2. The method of claim 1, further comprising generating an enable signal responsive to the first scaled version of the supply voltage exceeding the first reference voltage.

3. The method of claim 1, further comprising generating a third reference voltage by a low-dropout voltage regulator responsive to the first scaled version of the supply voltage exceeding the first reference voltage, wherein the bandgap circuit generates the second reference voltage based on the third reference voltage.

4. The method of claim 3, further comprising:
providing a third reference voltage to the low-dropout voltage regulator by connecting the low-dropout voltage regulator to a drain of a transistor during the first time period; and
providing the third reference voltage from the bandgap circuit to the low-dropout voltage regulator after the first time period.

5. The method of claim 1, further comprising generating a third reference voltage at a low-dropout voltage regulator responsive to the first scaled version of the supply voltage exceeding the first reference voltage, wherein the bandgap circuit provides the current based on the third reference voltage.

6. The method of claim 4, further comprising:
generating a first delay signal after the first time period for controlling a first switch between the first current generator and the bandgap circuit; and
generating a second signal after the second time period for controlling a second switch between the second current generator and the bandgap circuit.

7. The method of claim 1, wherein the integrated circuit device comprises a controller for a switch-mode power converter.

8. A start-up circuit for turning on or off an integrated circuit device, comprising:
a first voltage node for receiving supply voltage from a high voltage source;
a second voltage node connected to a low voltage source;
a Zener diode coupled between the first voltage node and the second voltage node;
a comparator coupled to receive a first reference voltage across the Zener diode and coupled to the first voltage node to receive a first scaled version of the supply voltage, the comparator is configured to:
turn on the integrated circuit device responsive to the first scaled version of the supply voltage exceeding the first reference voltage, and
turn off the integrated circuit device responsive to a second scaled version of the supply voltage dropping below a second reference voltage generated at a bandgap circuit, and
a first current generator configured to provide current in the bandgap circuit for a first time period after the first scaled version of the supply voltage exceeds the first reference voltage; and
a second current generator configured to provide current in the bandgap circuit for a second time period after the first time period, the second current generator having current regulating characteristics better than the first current generator, the second current generator in conjunction with the first current generator providing current for the bandgap circuit for a third time period after the first period and before the second time period.

9. The start-up circuit of claim 8, wherein the comparator is further configured to generate an enable signal responsive to the first scaled version of the supply voltage exceeding the first reference voltage.

10. The start-up circuit of claim 8, further comprising a low-dropout voltage configured to generate a third reference voltage responsive to the first scaled version of the supply voltage exceeding the first reference voltage, wherein the bandgap circuit is configured to generate the second reference voltage based on the third reference voltage.

11. The start-up circuit of claim 10, wherein the low-dropout voltage regulator is configured to:
receive a third reference voltage by connecting the low-dropout voltage regulator to a drain of a transistor during the first time period; and
receive the third reference voltage from the bandgap circuit to the low-dropout voltage regulator after the first time period.

12. The start-up circuit of claim 8, further comprising a low-dropout voltage regulator configured to generate a third reference voltage responsive to the first scaled version of the supply voltage exceeding the first reference voltage, wherein the bandgap circuit provides the current based on the third reference voltage.

13. The start-up circuit of claim 8, wherein the integrated circuit device comprises a controller for switch-mode power converter.

* * * * *